April 12, 1955  H. J. NESS  2,706,110
METALLURGICAL HEATING FURNACE
Filed Jan. 21, 1950  5 Sheets-Sheet 1

INVENTOR
H.J. NESS
BY M. J. Reynolds
ATTORNEY

April 12, 1955        H. J. NESS        2,706,110
METALLURGICAL HEATING FURNACE
Filed Jan. 21, 1950        5 Sheets-Sheet 2
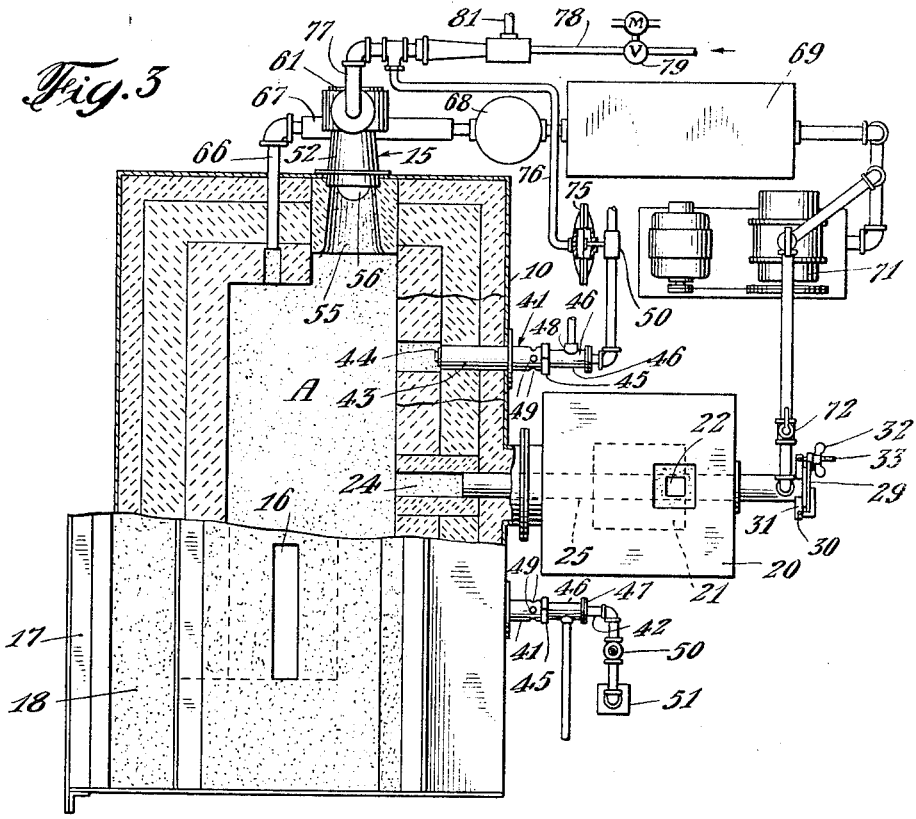
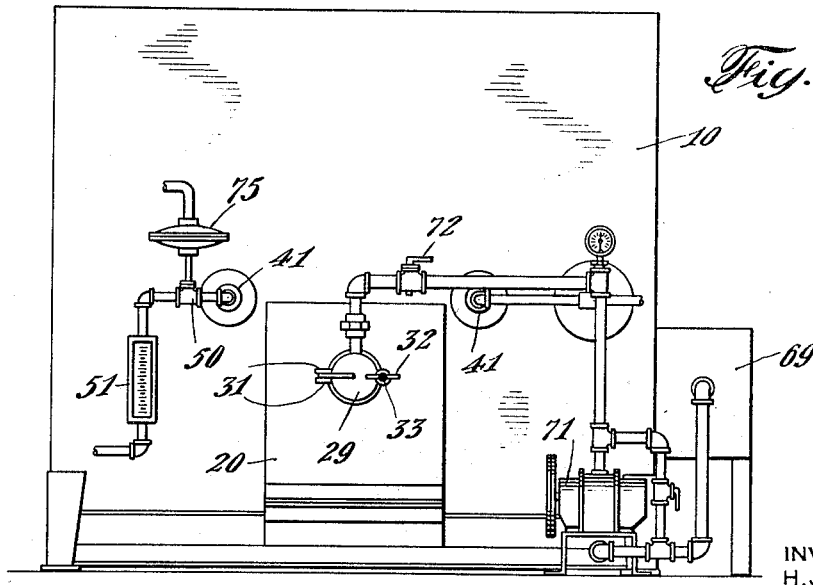
INVENTOR
H. J. NESS
BY
M. J. Reynolds
ATTORNEY INVENTOR
H. J. NESS
BY
M. J. Reynolds
ATTORNEY April 12, 1955  H. J. NESS  2,706,110
METALLURGICAL HEATING FURNACE
Filed Jan. 21, 1950  5 Sheets-Sheet 5
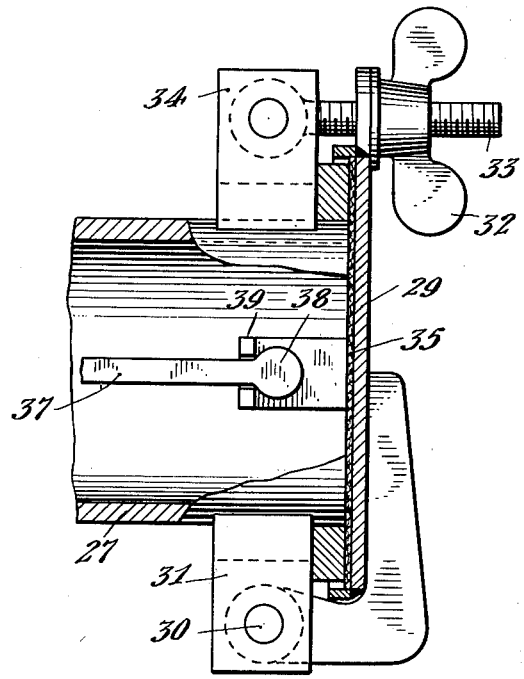
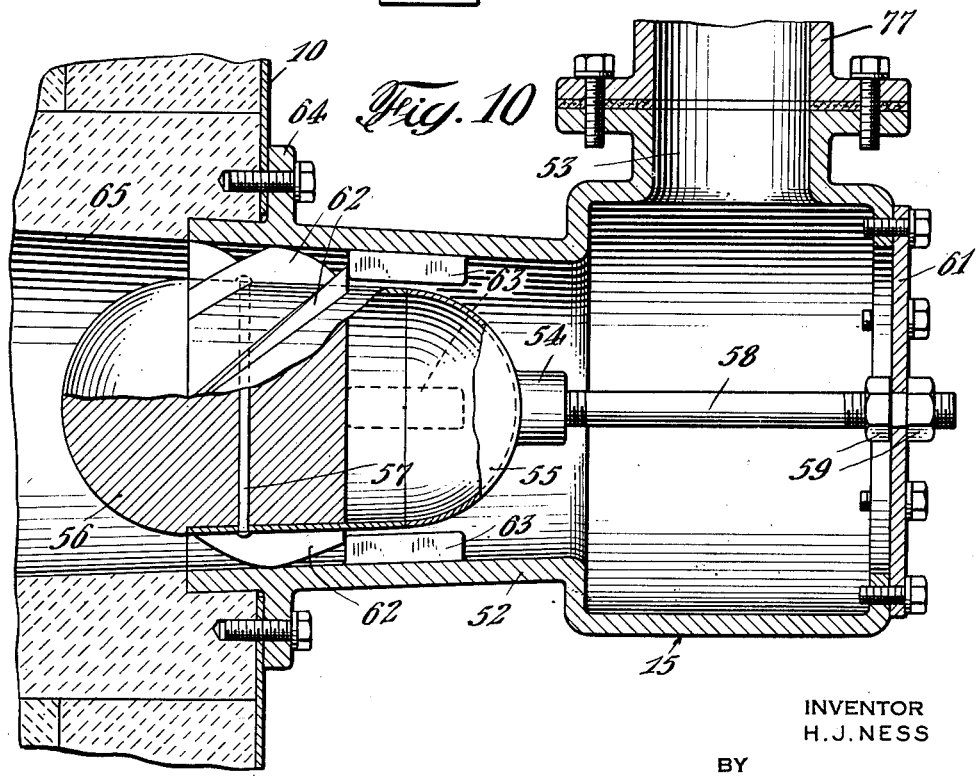
INVENTOR
H. J. NESS
BY
M. J. Reynolds
ATTORNEY

United States Patent Office 2,706,110
Patented Apr. 12, 1955

2,706,110

METALLURGICAL HEATING FURNACE

Harold Julius Ness, Montclair, N. J., assignor to Metallurgical Processes Co., Newark, N. J., a corporation of New Jersey Application January 21, 1950, Serial No. 139,906

1 Claim. (Cl. 266—5)

This invention relates to metallurgical furnaces and more particularly to direct fired combustion type furnaces in which parts to be heated are surrounded by the products of combustion.

One of the objects of the invention is to prevent or reduce to inconsequential amounts the decarburization of ferrous metals and the oxidation or scaling of both ferrous and non-ferrous metals, which is inherent in prior art processes of heating such metals directly in combustion gases.

Another object is to provide a protective atmosphere in a direct fired furnace which will be effective not only at ordinary heat treating temperatures but at the extremely high temperatures attained in heating parts for forging, rolling, extruding and similar hot working operations and in the soaking of steel.

Another object is to provide such a protective atmosphere in a simple and inexpensive manner and with a minimum of supervision and maintenance.

Another object is to increase the resistance to corrosion of metals during handling, storing and factory operations, and further to eliminate the usual surface preparation and provide an effective bonding agent for paint or other coating material to be applied to such metals.

A still further object is to provide lubrication for the dies, rollers and other metal working tools employed in the pressing, piercing, rolling or extruding of metals.

Still another object is to protect metals from the secondary oxidation or scale which normally occurs during cooling of the metal in air.

Another object is to provide scale-free heating in furnace atmospheres having a relatively high carbon dioxide-carbon monoxide ratio.

Still another object is to decrease the water vapor-hydrogen ratio relative to the carbon dioxide-carbon monoxide ratio in such combustion furnace atmospheres.

Other objects and advantages will hereinafter appear.

In my prior Patent No. 2,181,093, granted November 21, 1939, and entitled "Heat Treatment of Metals," I disclosed a forging type furnace in which a protective atmosphere was produced by the introduction of lithium compounds in powdered form directly into or closely adjacent the heating burners. This process produced an effective protective atmosphere at temperatures up to about 2000° F. but consumed a large amount of lithium compound, and was somewhat critical during the periods when the furnace went on control, that is, when the heating burners were cut off for temperature regulating purposes.

In my Patent No. 2,346,698 granted April 18, 1944, and entitled "Method of Producing Protective Atmospheres," I disclosed another method of producing a protective atmosphere for use with an indirectly heated furnace chamber, such as a muffle type furnace, in which the chamber atmosphere was produced externally of the chamber and treated by the vapors of lithium compounds prior to introduction into the chamber.

My present invention is related to the process of each of the above patents but has advantages not attained by either of them.

I have now discovered that under properly controlled conditions, a protective atmosphere may be produced in a directly fired furnace by introducing the vapor of lithium therein in extremely small amounts, thus providing the economy of manufacture, maintenance and operation of the direct fired type furnace with the ease and economy of atmosphere control inherent in the vapor method of introducing lithium compounds into the atmosphere and in addition permitting such protective atmosphere to be produced and maintained at much higher temperatures than is possible with the furnaces disclosed in either of the aforesaid patents. Of primary importance in the attaining of the desired results is the construction and location of the heating burners relative to the point of introduction and quantity of lithium vapor employed so that combustion is completed and the lithium fully reacted therewith sufficiently remote from the work being heated to permit a layer or blanket of raw hydrocarbon gas or vapor to be formed between the work and the lithiated products of combustion, by introduction of such raw hydrocarbon at a suitable point or points in the furnace chamber. The location of the furnace vents is also of importance in obtaining the desired protective atmosphere for the work and such points should be located so as to draw the lithiated products of combustion through the raw gas layer for reaction therewith and thence over or through the work.

The lithium compound vapor is introduced into the furnace in the vicinity of the burner or burners entrained in a suitable gas, by passing the gas over lithium compounds maintained at an elevated temperature. The carrier gas may be cracked or combusted products of any suitable fuel and may be produced in any desired form of gas generating apparatus, but preferably I desire to utilize the products of combustion of the heating furnace itself by withdrawing a portion thereof and recirculating the same through the lithium compound vaporizer, as will more fully appear.

The addition of the lithium containing gas under the above conditions effects a large reduction in the dew point of the furnace atmosphere, and while the lowered dew point or reduction in moisture content is not the sole factor in the protective nature of the atmosphere, it is closely associated with it and serves as a measure or indication of the effectiveness of the lithium compound additions in conditioning the combustion gases.

The reactions occurring within the furnace chamber between the lithium vapor, the combustion gas and the raw fuel additions is not fully understood but it is believed to be due, in part, to the promoting by the lithium of reactions between the products of combustion and the raw or unburned hydrocarbon fuel or the nascent carbon produced upon the cracking of the raw hydrocarbons. Whatever the chemical reactions, the evidence indicates that the combined effect of the addition of lithium and raw gas to the products of combustion, in the proper manner and amount, is to shift the equilibrium condition in the atmosphere so that even at temperatures up to 2500° F. or higher, the oxidizing potency of the atmosphere is overcome or greatly reduced at the work. In the absence of the lithium and raw gas additions, certain reactions occur, at about 2000° F., which result in the dissociation of carbon dioxide with a liberation of free oxygen thus rendering the atmosphere strongly oxidizing. Neither the addition of lithium alone nor the addition of raw hydrocarbon alone appears to materially effect these dissociation reactions—whereas the combined effect of both the lithium and the raw gas additions, when properly controlled and related to each other and to the combustion gases, definitely inhibits this oxidizing condition either by preventing the dissociation or causing a different gas equilibrium condition to be produced which is non-oxidizing in nature.

The considerations which preclude oxidation of the work also tend to reduce decarburization of ferrous metals and together with the blanket of raw gas provided adjacent the work or the nascent carbon produced therefrom substantially preclude any decarburization of the work or, if desired, under properly controlled condition may actually render the furnace gases carburizing to ferrous metals.

The amount of lithium compound required to render the products of combustion non-oxidizing and non-decarburizing when introduced in vapor form into the combustion gases is extremely small, of the order of magnitude of $\frac{1}{20}$ to $\frac{1}{50}$ of that required in the process of my aforesaid Patent No. 2,181,093, and in addition is equally effective whether the burners are operating at full capacity or on control. The enormous reduction in the amount of lithium required in combustion furnaces by the present process over that in which the powdered compounds are employed is not fully understood but is believed to be due in part to the more active nature of the vapor form of the lithium compounds. Whatever the chemical reactions may be the end result is an increase in the CO content relative to the $CO_2$ content, of the combustion gases, thus lowering the $CO_2/CO$ ratio in the furnace atmosphere. Water vapor also decreases from a dew point of approximately 125° F. to a dew point of from 60 to 70° F. as determined by the standard bulb dew point test. This corresponds to a decrease from approximately 12% moisture, by volume, to from 1.3% to 1.6% thereby decreasing the $H_2O:H_2$ ratio in the furnace gases.

It will be noted hereinafter, however, that the decrease in the $CO_2/CO$ and $H_2O/H_2$ ratios is not proportional, in accordance with the normal fixed relationship existing between these ratios at various temperatures in non-lithiated furnaces, but is disproportionately greater for the $H_2O/H_2$ ratios, whereby these ratios are displaced far to the reducing side of the accepted $H_2O/H_2$ equilibrium curves for pure gas, whereas the $CO_2/CO$ ratios are likewise displaced towards the reducing side of the normally accepted $CO_2/CO$ equilibrium curves for pure gases. However, due apparently to the strongly reducing nature of the $H_2O/H_2$ ratios prevailing in the atmosphere, it is possible to obtain a non-scaling condition in the furnace with $CO_2/CO$ ratios that are on the oxidizing side of the normally accepted $CO_2/CO$ equilibrium curves. In other words, the teachings of the present invention enable the $CO_2/CO$ equilibrium condition to be obtained at higher ratio values while the actual $CO_2/CO$ ratios attained in the furnace are lowered to or below such higher equilibrium values thereby resulting in a scale-free atmosphere. This phenomenon will be further discussed in connection with the accompanying drawings.

It has been found desirable, however, in order to obtain advantage of the full potency of the lithium compounds to retard the lithium reactions until the lithium vapor is brought into contact with the combustion gases and to effect these reactions at a point where combustion has been substantially completed but at which the products thereof are still at their maximum energy level. The first result is effected by employing a lithium vapor entraining gas which has been previously reacted with lithium. A gas of this nature is obtained most readily by withdrawing a portion of the lithiated products of combustion from the furnace chamber, at a suitable point, and cooling the same to permit them to be passed through an appropriate pump for recirculation through the lithium vaporizer.

The reacting of the high potency lithium vapor with the products of combustion when the latter are at their maximum energy level is accomplished by judicious selection of the point or points of introduction of the lithium laden carrier gas into the furnace chamber. Obviously this should be at a point adjacent the burners but sufficiently spaced therefrom so as not to contact the combustion products until combustion has been substantially completed. For this purpose it is preferable to employ short flame burners operating with a non-luminous flame and in which, by suitable premixture of the air and fuel supply, combustion is substantially completed in the burner blocks or in a restricted zone closely adjacent thereto. The lithium laden gas is then introduced at a point so as to bring it into contact with the combusted but still highly active gases. Unless precautions of this nature are taken to obtain the proper reaction of the lithium vapor with the initial products of combustion, the effectiveness of the subsequent raw gas additions is materially reduced.

In furnaces of small or medium size, it is often desirable to introduce the lithium laden gas from the opposite side of the furnace in opposed relation to the burners or through an adjacent wall in a direction transversely of the burner stream. It is not to be understood, however, that the point of introduction of the lithium is critical since a high degree of protection is obtainable by introducing the lithium more remotely from the burners, the considerations referred to indicating merely the preferred arrangements for maximum effectiveness of the lithium in conditioning the products of combustion.

It is also desirable, in order to obtain the most effective results, to prevent cracking of the raw hydrocarbon additions, until these additions come in contact with the lithiated products of combustion. Therefore, I prefer to cool the hydrocarbon addition gas inlet conduits by a suitable cooling medium and to introduce the hydrocarbon additions in the form of a layer or blanket between the work and the main combustion chamber, and to locate the exhaust vents so that the lithiated products of combustion pass through and intermingle with the raw hydrocarbon layer.

By suitable regulation of the raw hydrocarbon and the lithium vapor additions it is possible to maintain a substantially neutral or non-oxidizing and substantially non-decarburizing or even carburizing condition in the furnace up to temperatures of 2500° F. or higher. This is extremely important, particularly in forging and billet heating furnaces which operate about 2000° F.

In addition to the protection afforded by the atmosphere against chemical reaction with the work, the lithium forms a thin adherent coating on the work which, in subsequent working of the metal, serves as a lubricant for the dies, rollers, etc., and greatly reduces the wear of these members. While the process of my Patent No. 2,181,093 also produced a coating, it was of an entirely different nature, being heavy and flocculent whereas the coating produced by the present process may be controlled to an extremely thin closely adherent film, of the order of several microns in thickness. This thin adherent coating has been found to be much more effective in reducing die wear than the heavy coating heretofore obtained, due to the fact that the heavy coating tended to flake off whereas the thin coating now obtainable is sufficiently adherent and flexible to remain on the work even through such operations as extrustion, upsetting, piercing, etc. This coating appears to be a compound or mixture of lithium carbonate and iron, the carbonate evidently being formed upon removal of the heated parts from the furnace and exposure thereof to the air, and serves to eliminate or reduce the secondary scaling of the parts which normally occurs during the working and/or cooling thereof in air. The invention will be more fully understood by reference to the accompanying drawings, in which:

Fig. 3 is a plan view, partly in stepped section, of the furnace of Fig. 1;

Fig. 8 is an enlarged sectional view of the vaporizer tube closure member;

Fig. 9 is a schematic view of the piping and valve arrangement for the vaporizer fuel supply to the furnace of Fig. 1;

Figure 11:
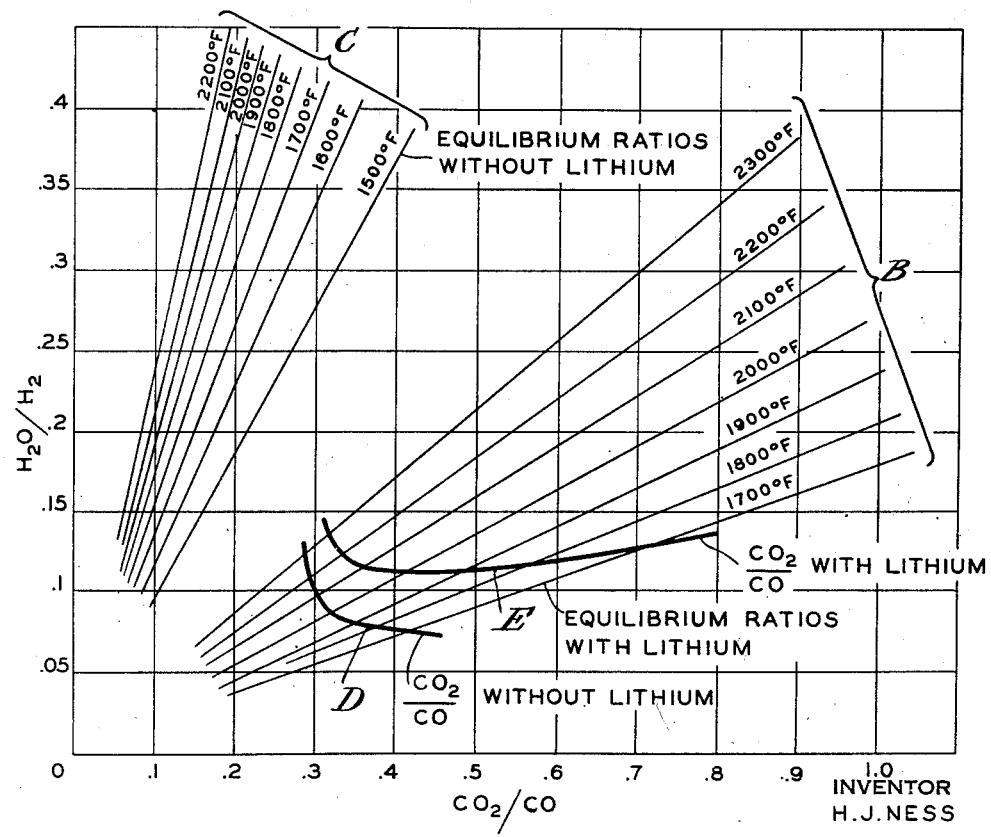

Fig. 10 is a vertical sectional view of a burner particularly suitable for the practice of the invention; and Fig. 11 is a series of curves showing the $CO_2/CO$ equilibrium ratios and the relationship existing between the $CO_2/CO$ and $H_2O/H_2$ ratios at various temperatures in the operation of (a) conventional combustion type furnaces and (b) furnaces operated in accordance with the present invention.

Figure 1:
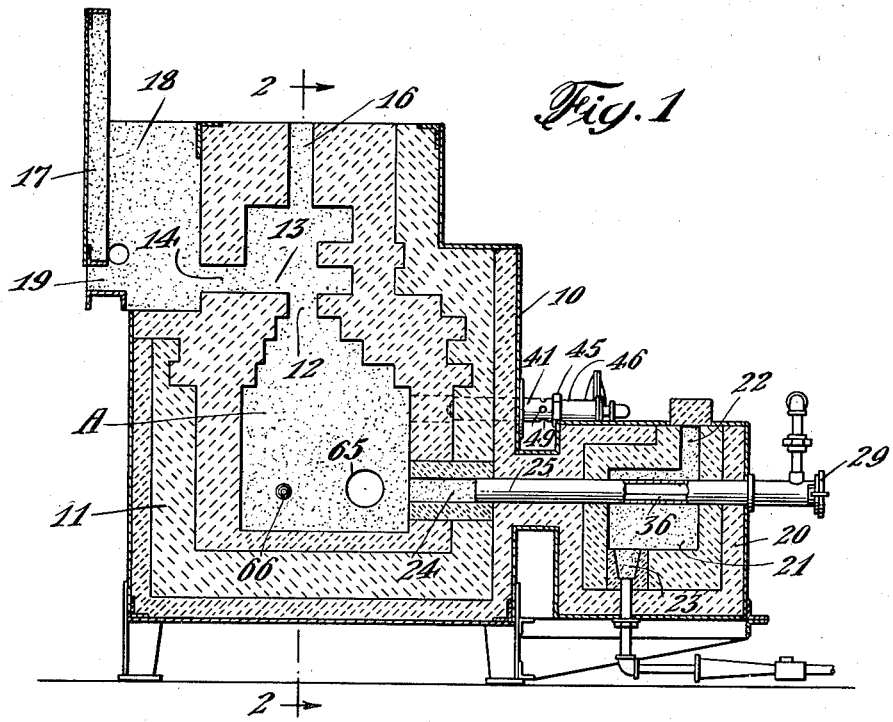
Fig. 1 is a vertical sectional view of a vertical slot type forging furnace, embodying the present invention.
Figure 2:
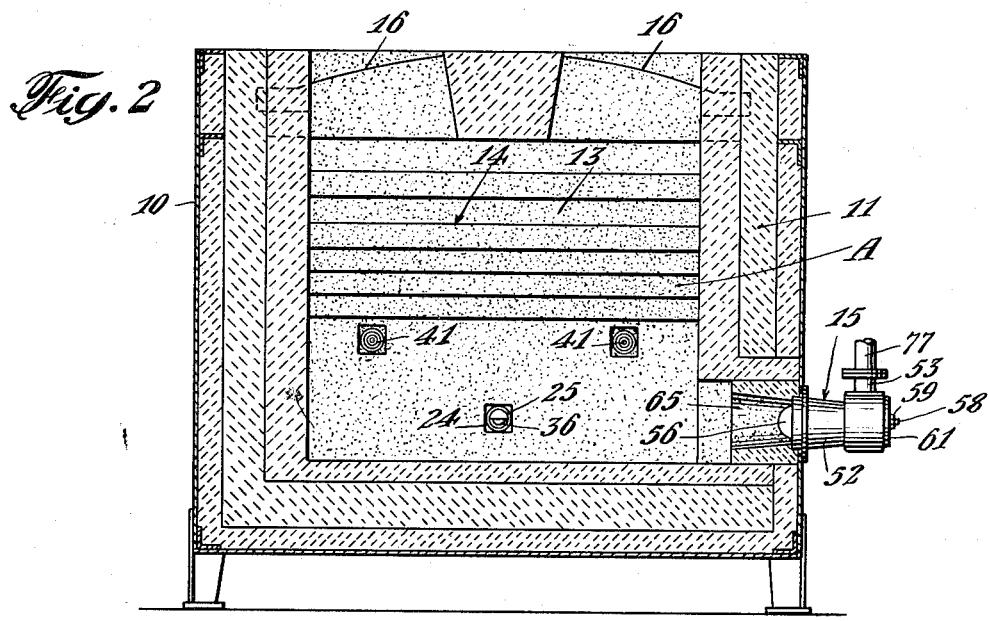
Fig. 2 is a vertical sectional view on the line 2—2 of Fig. 1.

Referring first to Figs. 1, 2 and 3, the furnace there shown comprises an outer metal shell 10 supported upon suitable legs and containing a refractory brick lining 11 which defines the combustion chamber A having a vertical slot or throat 12 for the passage of the combustion gases to the hearth 13, which is provided with a slot or opening 14 for the insertion of work to be heated, and one or more burners 15 for supplying fuel and air for heating the chamber A.

The slot 14 is normally open but may be closed by a door (not shown) if desired. A pair of vents or flues 16 are provided above the hearth 13, for the escape of the products of combustion. A front refractory wall 17 or heat guard spaced from the main wall of the furnace forms a secondary flue 18 for diverting the furnace gases from the work opening 19.

In furnaces of this type it is necessary to employ a large fuel consumption in order to attain the requisite temperatures of from 2000° F. to 2500° F., the volume of the products of combustion formed per minute being from 50 to 70 times the cubical capacity of the furnace chamber so that the rate of travel of the gaseous products through the furnace is very high, being of the order of one complete change per second. An attempt to neutralize this enormous volume of products of combustion by introducing lithium compounds into the furnace in powdered form, as disclosed in my prior Patent No. 2,181,093, resulted in the major portion of the compounds being swept through the furnace and vented to the atmosphere without reaching the vapor state and reacting with the furnace gases, and only those particles which were fortuitously delayed in their passage were active. As a consequence large volumes of lithium compounds were wasted.

In accordance with the present invention this difficulty is overcome by introducing the lithium into the furnace chamber in a highly active vapor form, so as to enhance its reaction with the products of combustion. For this purpose the furnace shell is provided with a rectangular box-like attachment 20 at one side thereof, lined with refractory brickwork to define a second combustion chamber 21 having a vertical flue 22 and one or more burners 23. An opening 24 in the brickwork leads from the combustion chamber 21 into the main combustion chamber A, and a tubular conduit 25 extends through the rear wall of the attachment 20, the enclosed brickwork and the combustion chamber 21, terminating in the opening 24 adjacent to the combustion chamber A.

Figure 5:
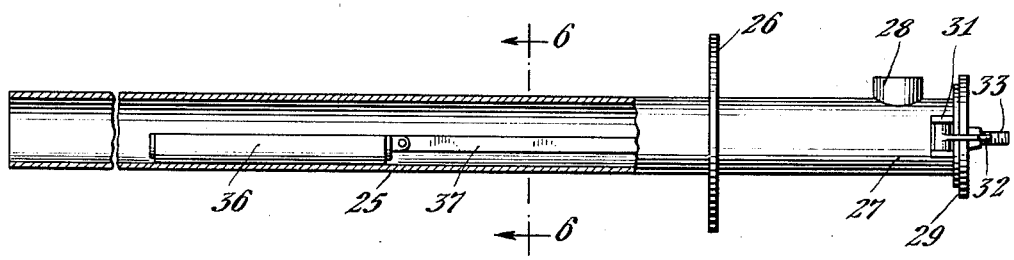
Fig. 5 is a sectional view of the lithium vaporizing tube of Fig. 1 showing the removable lithium container or boat in place therein.

The tubular conduit 25 forms a vaporizing chamber for the lithium compounds to be added to the furnace atmosphere and, as more clearly shown in Fig. 5, comprises the tube 25 of suitable heat resisting alloy connected to the shell of the attachment 20 by a flange 26 and having, externally of the combustion chamber, a short tubular section 27 provided with an inlet 28 for introduction of a suitable gas into the member 25 and an open end, adapted to be closed by a cover 29. As more clearly shown in Fig. 8, the cover 29 is pivoted at 30 between the ears 31 welded to the section 27 of the vaporizing chamber and is secured in closed position by a clamping nut 32 threaded upon a bolt 33 pivoted between the ears 34. A gasket 35 is interposed between the cover 29 and the open end of the section 27.

Figure 6:
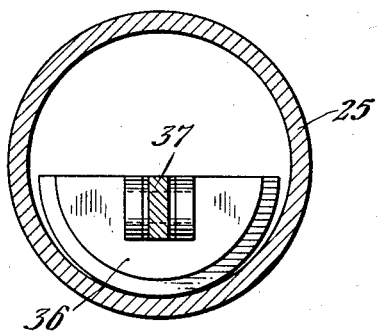
Fig. 6 is a sectional view on the line 6—6 of Fig. 5.
Figure 7:
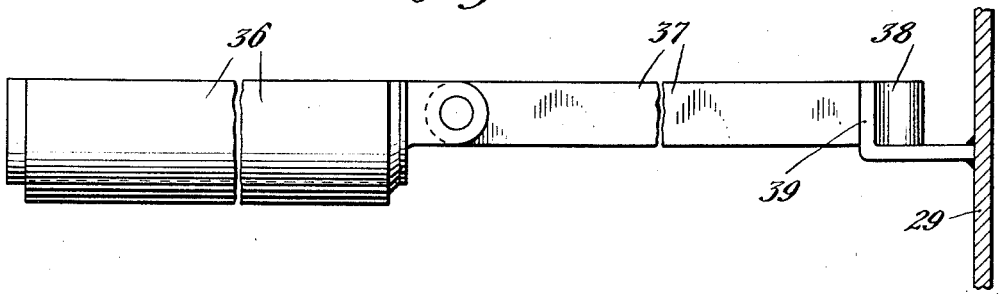
Fig. 7 is a detail view of the lithium container or boat.

The lithium compounds are inserted into the vaporizing tube 25 in the form of a compressed or fused cake, disposed within a semi-cylindrical boat 36 (Figs. 5, 6 and 7) secured to the end of a draw rod 37 which terminates in a knob 38 adapted to engage in a notched lug 39 attached to the cover 29, so as to accurately position the boat 36 in the tube 25 centrally of the combustion chamber 21. The charge placed within the boat 36 preferably comprises a mixture of lithium carbonate and lithium chloride in the proportion of 60% of the former and 40% of the latter.

The gas introduced into the vaporizer tube 25 through the inlet 28 may be any neutral gas but for economy I prefer to employ products of combustion of any suitable fuel, such as oil, city gas, natural gas, propane, etc. This gas in passing through the tube 25 entrains a small amount of the vapor of the lithium compounds and carries the same into the chamber A where it reacts with the furnace gases.

The amount of lithium compound used is extremely small and may be regulated by the rate of the flow of the carrier gas and by adjustment of the temperature of the combustion chamber 21, through suitable pyrometer control means, as is well known in the art.

Figure 4:
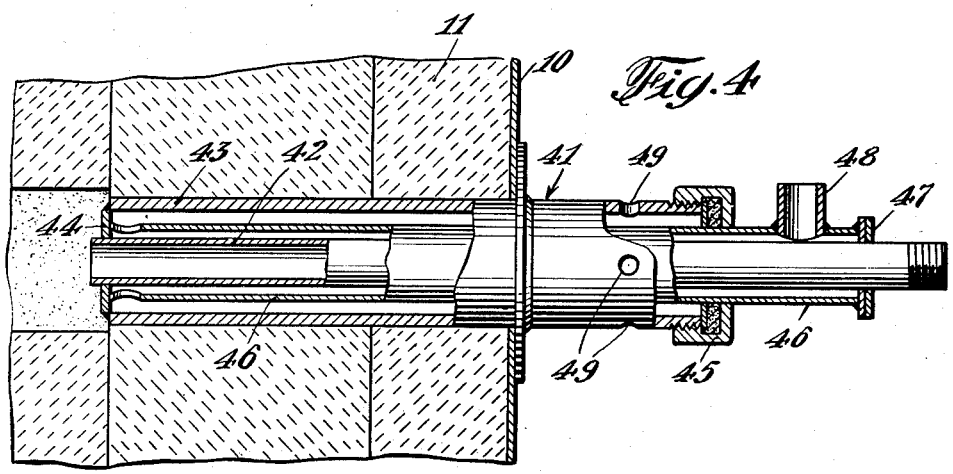
Fig. 4 is a sectional view, on a larger scale, of the supplemental gas inlet conduit.

As has been stated, the action of the lithium in neutralizing the combustion gases is enhanced by the addition of a small amount of unburned or raw gas into the furnace chamber, and for this purpose I provide one or more inlets 41, between the burners 15 and the hearth 13, which are connected to a source of suitable hydrocarbon fuel, such as city gas, natural gas, propane or oil vapor. As shown in Fig. 4, each such gas inlet 41 comprises an inner tube 42 carried within an outer tube 43 sealed against the tube 42 at the outlet end by a welded annulus 44 and sealed at the opposite end by a packing gland 45 threaded to the tube 43 and surrounding an intermediate tube 46, open at the furnace end and sealed to the tube 42 at the opposite end by the annulus 47.

The tube 46 has an inlet opening 48 communicating with a source of cooling fluid under pressure, such as air, and tube 43 is provided with a series of openings 49 for the escape of the cooling medium. The raw fuel is supplied from a suitable source to the inner tube 42 through a valve 50 (Fig. 9) whereby the volume of gas admitted may be controlled.

The location and arrangement of the raw gas inlet pipes in relation to the work and the main furnace burners is of considerable importance for the attainment of the most effective results. Preferably the gas inlets should be disposed adjacent the hearth, between it and the main volume of the combustion chamber, so as to form a blanket or layer of such gas intermediate the work and the products of combustion of the furnace burners, with the exhaust vents disposed so as to draw both the raw gas and the burner products past the work. Thus in Fig. 1 the main burners 15 are disposed adjacent the floor of the furnace and produce a combustion gas circulation along the floor and thence upward over the work to the vents 16 and 18. The raw gas inlet tubes 41 are preferably arranged at spaced points in the rear wall at the upper end of the combustion chamber so as to admit the raw fuel in a transverse layer through which the combustion gases must pass in their movement towards the vents. A number of such raw gas inlets may be provided spaced apart a distance such that the gas from one inlet merges with that of the next and thus forms a layer which completely envelopes the work from the combustion gases in the lower portion of the furnace chamber. By means of test pieces disposed throughout the furnace, it is possible, by adjustment of the gas flow to each inlet, as indicated by a flow meter 51, to control this blanket so that protection is obtained over the entire working area of the furnace.

The fuel for the main burners 15 may be oil, city gas, natural gas, propane or any other type of heating fluid, and may be premixed or mixed in the burners, providing a type of burner is employed in which the combustion is substantially completed within the burner block.

In Fig. 10 I have shown a burner which is particularly suitable for the purpose of the invention. It comprises a casing 52 having an inlet 53 for a suitably proportioned air-gas mixture. Within the casing there is provided an insert 54 comprising a tapered shell 55 having a refractory ceramic insert 56 secured therein by a rivet 57. The shell 55 has a rearwardly extending stem 58 secured by nuts 59 to a plate 61 in turn bolted to the casing 52. The shell 55 has on its outer periphery a series of spiral vanes 62 which fit snugly within the burner casing against a series of spaced lugs 63. The burner casing 52 is secured to the outer shell 10 of the furnace by flanges 64.

The purpose of the vanes 62 is to break up the incoming air-gas mixture and produce a turbulence within the burner block 65 which, by the scrubbing action of the gases on the hot refractory insert 56 and the walls of the burner block, effects a rapid burning in the burner tunnel and avoids the delayed stratified combustion of the mixture normally occurring within the furnace chamber. As a result complete reaction of the mixture is effected substantially at the instant the gases enter the furnace chamber at which time the gases are at their maximum energy level. As heretofore pointed out, this is important in obtaining maximum effectiveness of the reaction of the combustion gases with the lithium vapor which is introduced transversely of the incoming combustion gases through the inlet port 24.

The carrier gas for the lithium vaporizer tube 25 may be supplied from any suitable gas cracking or precombustion device but I prefer to employ a previously lithiated combusted gas most readily obtained by withdrawing a small portion of the gas from the combustion chamber A and recirculating it through the vaporizer tube 25. One manner of accomplishing this is shown in Figs. 3 and 9. A tube 66 extending through a wall of the furnace is connected serially to a precooler 67, a suitable strainer 68, a heat exchanger 69, recirculating pump 71, valve 72, and thence to the inlet 28 of the vaporizing tube 25. The pump 71 serves to withdraw the combustion gases from the furnace and force them, after cooling, to the vaporizer tube 25. The precooler 67 may be a simple water-jacketed conduit and serves to reduce the gas temperature sufficiently to protect the strainer 68 and relieve the heat exchanger 69 of the full heat load. The gases leaving the heat exchanger are preferably cooled to the temperature of the tap water employed in the heat exchanger and, due to condensation, the gases will have a dew point corresponding to such tap water temperature. Preferably this should be from 60° to 70° F.

The quantity of carrier gas supplied through the valve 72 to the vaporizer tube 25 is not critical but should be sufficient to entrain the required amount of lithium vapor from the boat 36. Thus, in a furnace of the type illustrated having a combustion chamber with a cubical capacity of 4 cu. ft. and a fuel gas consumption of 500 cu. ft. per hour of 550 B. t. u. city gas, satisfactory operation is obtainable with a vaporizer temperature of 1600° F. and a carrier gas flow of 100–125 cu. ft. per hour of combusted gas.

The hydrocarbon addition, with suitable diluents, if desired, may be supplied to the inlet tube 41 from any suitable source, such as bottled propane, city gas, oil vapor, or the like, through the valve 50 and a flow meter 51 (Fig. 9). The valve 50 is operated to permit a flow of raw hydrocarbon into the furnace chamber proportional in volume to the air-gas mixture supplied to the main burners 15, by means of a diaphragm regulator 75, the diaphragm of which is articulated at the atmosphere side thereof to the stem of the valve 50 and is in communication at its opposite side, through a conduit 76, with the air-gas conduit 77 of burner 15 whereby the pressure of the air-gas mixture serves to actuate the diaphragm to regulate the flow of hydrocarbon through the valve 50 and inlet tube 51. The air-gas mixture is supplied to the conduit 77 through a venturi mixing tube 78, the air being admitted thereto through a motorized valve 79 controlled by a suitable pyrometer, as is well understood in the art, and the fuel being induced by the air flow from the fuel conduit 81 supplied with the usual zero regulator, not shown. As a consequence of the above provisions, the raw hydrocarbon blanket supplied adjacent the work remains in substantially uniform proportion to the volume of combustion products from the burners 15, as the latter are varied to maintain the required furnace temperature. The amount of lithium, supplied through the vaporizer tube 25, is not critical and remains constant throughout the operation of the furnace.

It is not to be understood from the foregoing that the amount of hydrocarbon gas added to the furnace atmosphere is critical, since it may be varied within rather wide limits, the most effective amount depending upon the physical characteristics of the furnace, the temperature of operation and the nature of the gas employed. However, once determined for the above conditions, it should be maintained in substantial proportion to the products of combustion from the burners 15.

Thus with the furnace referred to above, the gas addition, when using propane, may vary, depending on the temperature of operation of the furnace, from 10 to 40 cu. ft. per hour when the burners are in full operation. When employing a lower B. t. u. gas, such as 550 B. t. u. city gas, through the inlet tube 41, a larger flow will be required, other conditions remaining the same, and in the furnace referred to herein a typical city gas addition may be from 50 to 200 cu. ft. per hour.

The $CO_2$, $CO$, $H_2O$ and $H_2$ content of the gas within the furnace adjacent the work, at an operating temperature of about 2000° F., compared with ordinary non-lithiated combustion gases is of the general nature indicated below:

| Lithiated | Ratio | Non-Lithiated | Ratio |
|---|---|---|---|
| $CO_2$—5.7<br>$CO$—15.3 | .37 | $CO_2$—5.5<br>$CO$—8.5 | .64 |
| $HO$—1.7<br>$H_2$—13.1 | .13 | $H_2O$—17.4<br>$H_2$—14.5 | 1.2 |

The chief advantage to be observed from the above comparison of the atmosphere of the present invention over conventional direct fired furnace atmospheres is the high CO content and the low water vapor content, resulting in low $CO_2/CO$ and $H_2O/H_2$ ratios. Since freedom from scale is dependent upon low values for these ratios in the furnace atmosphere, it will be appreciated that the phenomenal reduction of both of these ratios produces a marked reduction in the oxidizing characteristic of the atmosphere. The reduction in the $H_2O/H_2$ ratio places this ratio far to the reducing side of the accepted equilibrium values for these constituents. The reduction in the $CO_2/CO$ ratio is sufficient to place this ratio below or close to the equilibrium values of these constituents with steel. However, due to the strongly reducing effect of the $H_2O/H_2$ ratios, it is possible to operate with $CO_2/CO$ ratios which are considerably above the normally accepted equilibrium values of $CO_2$ and $CO$, without producing scale.

In Fig. 11 the radiating straight line curves B represent the general nature of the relationship between the $CO_2/CO$ ratios and the $H_2O/H_2$ ratios at various temperatures in the presence of lithium, following the teachings of the present invention. The exact slope of these curves will depend upon the effectiveness of the reactions of the constituents of the furnace atmosphere, including the completeness of the combustion reactions of the air-gas mixture adjacent to the burners 15, and the manner and amount of lithium and hydrocarbon additions. With decreased effectiveness these relationship curves become steeper approaching the series of curves C, which indicate the relationship existing in conventional, non-lithiated furnace atmospheres.

The curve D shows the accepted equilibrium values for the $CO_2/CO$ ratios, in pure non-lithiated gases plotted against the temperature curves B. It will be noted from this curve that at 2000° F. it would be necessary to obtain a $CO_2/CO$ ratio of not more than 0.325 to obtain a neutral or non-scaling condition, whereas in conventional combustion type furnaces it is not possible to obtain $CO_2/CO$ ratios of less than about 0.7 at this temperature. While the curve B for pure gases does not necessarily apply to the mixed gases of an ordinary combustion furnace, the values shown are indicative of the magnitude of the permissible $CO_2/CO$ ratios for a scale-free atmosphere and the obtainable ratios of more than double value are far to the oxidizing side and are strongly scaling. This scaling condition of conventional furnaces is further increased due to the high $H_2O/H_2$ ratio prevailing in such furnace which is well into the scaling region of these ratios. As a consequence, it has not heretofore been possible to obtain a combustion type atmosphere which was not strongly scaling in nature.

Curve E of Fig. 11 indicates the general position of the $CO_2/CO$ ratio permissible in carrying out the process of the instant invention while maintaining a scale-free condition in the furnace. Moreover, it is readily possible by following the teachings of the invention to obtain $CO_2/CO$ ratios considerably below the values represented by this curve and thus obtain a combustion type furnace atmosphere which is completely non-scaling in nature. The scaling rate for a considerable distance above the curve E is relatively slow and where the heating period is not unduly prolonged, substantially scale-free heating may be effected at $CO_2/CO$ values considerably in excess of those represented by curve E, and in any event a great reduction in scale over that obtained in conventional combustion type furnaces will be obtained. Therefore, I do not desire to be limited to the particular values represented by the curves of Fig. 11 but contemplate, as coming within the scope of the invention, all advantages resulting from an observation of the conditions set forth in the foregoing specification.

I claim:

In a combustion type furnace, the combination of a heating chamber, means for supporting work to be heated in said heating chamber, burner means for said chamber, means for supplying a combustible mixture to said burner means, means for substantially completing reaction of said combustible mixture closely adjacent to said burners, a vaporizing chamber adjacent to said heating chamber, means for supporting a lithium compound in said vaporizing chamber, means for withdrawing a portion of the products of combustion from said heating chamber and passing the same through said vaporizing chamber in contact with said lithium compound for entraining the vapor therefrom, means for admitting said lithiated products of combustion into the heating chamber intermediate said work supporting means and the point or points of entry of said products of combustion into the heating chamber, and means for introducing an unreacted hydrocarbon containing fuel into said heating chamber closely adjacent the work to be heated.

(References on following page)

References Cited in the file of this patent

UNITED STATES PATENTS

| | | | |
|---|---|---|---|
| 1,754,603 | Brown | Apr. 15, 1930 |
| 2,181,092 | Ness | Nov. 21, 1939 |
| 2,181,093 | Ness | Nov. 21, 1939 |
| 2,228,564 | Guthrie | Jan. 14, 1941 |
| 2,237,785 | Knapp | Apr. 8, 1941 |
| 2,274,209 | Ness | Feb. 24, 1942 |
| 2,346,698 | Ness | Apr. 18, 1944 |
| 2,394,002 | Ness | Feb. 5, 1946 |

FOREIGN PATENTS

| | | |
|---|---|---|
| 455,276 | Great Britain | Nov. 19, 1936 |